United States Patent [19]

Shioi et al.

[11] 4,245,146

[45] Jan. 13, 1981

[54] HEATING ELEMENT MADE OF PTC CERAMIC MATERIAL

[75] Inventors: Ryoichi Shioi; Kazumasa Umeya; Kazunari Yonezuka; Hisao Senzaki, all of Nikahomachi, Japan

[73] Assignee: TDK Electronics Company Limited, Tokyo, Japan

[21] Appl. No.: 882,922

[22] Filed: Mar. 2, 1978

[30] Foreign Application Priority Data

Mar. 7, 1977 [JP] Japan .................................. 52-24597

[51] Int. Cl.³ .......................... F24H 3/04; H05B 3/14; H01C 7/02; C04B 35/46

[52] U.S. Cl. .................................... 219/381; 219/374; 219/505; 252/62.3 BT; 252/520; 338/22 SD; 338/23

[58] Field of Search ........................ 252/62.3 BT, 520; 219/374, 381, 504, 505; 338/22 R, 22 SD, 23

[56] References Cited

U.S. PATENT DOCUMENTS

| | | | |
|---|---|---|---|
| 2,976,505 | 3/1961 | Ichikawa | 252/520 X |
| 3,927,300 | 12/1975 | Wada et al. | 219/381 |
| 3,975,307 | 8/1976 | Matsuo et al. | 252/520 |
| 4,032,752 | 6/1977 | Ohmura et al. | 219/541 |

FOREIGN PATENT DOCUMENTS

| | | | |
|---|---|---|---|
| 929350 | 6/1955 | Fed. Rep. of Germany | . |
| 47-41153 | of 1972 | Japan | 252/62.3 BT |
| 714965 | 9/1954 | United Kingdom | 252/520 |
| 1018057 | 1/1966 | United Kingdom | 252/520 |

OTHER PUBLICATIONS

NGK Technical Report, "Honeycomb Structure $BaTiO_3$ Ceramics for Heater Applications", Published by NGK Insulators, Ltd., Nagoya, Japan, 7 pages total, Mar. 1974.

*Primary Examiner*—C. L. Albritton
*Assistant Examiner*—E. F. Borchelt
*Attorney, Agent, or Firm*—Armstrong, Nikaido, Marmelstein & Kubovcik

[57] ABSTRACT

Disclosed herein is a heating element for an air heater and the like comprising a ceramic material in the form of a honeycomb as well as the process for producing the ceramic material. The heating element is characterized by its relatively high amount of heat generation capability compared to a conventional heating element of the same size. Preferable ceramic materials for the heating element have a temperature coefficient of electrical resistance of from 5 to 20%/°C., and consist essentially of from 38.7 to 47.3 molar % of BaO, from 2.5 to 11 molar % of PbO, from 49.8 to 50% of $TiO_2$, from 0.05 to 0.3 molar % of a semiconductor forming element and from 0.002 to 0.015 part by weight of Mn.

3 Claims, 3 Drawing Figures

HEATING ELEMENT MADE OF PTC CERAMIC MATERIAL

The present invention relates to heat elements in the form of a honeycomb structure with a number of apertures and constructed of a ceramic material having a positive temperature coefficient of electrical resistance.

A semiconductive material composed of barium titanate and having a positive temperature coefficient of electrical resistance is well-known under the abbreviation of PTC ceramic material. The use of PTC ceramic material in an automatically controllable heating element has recently attracted attention, because the electrical resistance of the PTC ceramic material increases suddenly at a temperature exceeding the Curie point, thereby excellently protecting the heating element from the danger of overheating. The PTC ceramic material is therefore employed for various sources of heat generation.

The heating element made of the PTC ceramic material is superior to the conventional heater made of iron-chromium wires, because electric current can not pass through the PTC ceramic material when the temperature of the PTC ceramic material is elevated higher than a certain temperature, for example, from 170° to 190° C. Thus, it is not necessary to equip the heating element made of PTC ceramic material with a temperature control device, and the heating element is extremely safe. In addition, since the heating element cannot be damaged due to the passage of an excessive current, the heating element has an advantageously long service life.

In recent years, PTC ceramic material has been practically employed in air heaters, hair dryers, clothes dryers and the like. These heaters and dryers are manufactured with the PTC ceramic material in the form of a honeycomb structure and an air feeding device for forced circulation of the air through a number of apertures or channels, which pass through the honeycomb structure (U.S. Pat. No. 3,927,300 and U.S. Pat. No. 4,032,752). With such heaters and dryers, however, it is necessary to considerably enlarge the surface area of the channels in the heating element over that of the conventional iron-chromium heater, in order to provide the heating element with the same amount of the heat radiation capability as that of the conventional iron-chromium heater.

It is, therefore, an object of the present invention to reduce the size of the heating element made of PTC ceramic material, while the amount of heat radiation capability from the heating element remains essentially unchanged by the reduction of the size of this element, or alternately, the heat radiation capability is increased while the size of this element remains essentially unchanged.

It is another object of the present invention to provide a process for producing ceramic material suitable for use as a heating element.

In accordance with the object of the present invention, there is provided a heating element essentially consisting of:

a body of ceramic material having a positive temperature coefficient of electrical resistance, said body including a number of channels for a fluid medium passage regularly arranged in the body;

a pair of ohmic electrodes electrically connected to the ceramic body at the opposite sides of the body; and a means for feeding said fluid medium through the channels;

which heating element involves an improvement which comprises using a ceramic semiconductive material having a positive temperature coefficient of electrical resistance of from 5 to 20%/°C. It is preferable to generate heat in an amount of 400 and more watts from the ceramic body, when a voltage of 100 volts is applied to the body, and further, said fluid is fed at a rate of 400 l/minute, and maintaining the ratio of said heat generating amount relative to the total surface area of the walls of said channels higher than 1.4 watt/cm$^2$, and occasionally providing the walls of said channels with the total surface area of from 150 to 280 cm$^2$, thereby increasing the heat generating efficiency of the heating element.

Generally, the ceramic body is column shaped. The round-, rectangular-, square- or hexagonal-shaped channels, extend through the columnar ceramic body generally parallel to each other. The solid parts of the ceramic body have an almost uniform thickness to each other and are used as the partitions for defining the channels. The ohmic electrodes are connected to the opposite ends of the partition wall parts by the aid of a metallizing or a screen printing technique, and the like. The fluid feeding means is usually a fan or the like and is fixedly positioned in the axial direction of the columnar ceramic body.

The temperature coefficient of the PTC ceramic material according to the present invention is described hereinbelow, in connection with the FIG. 1.

When voltage is applied to PTC ceramic material, the amount of heat generated in the PTC ceramic material depends upon the voltage and the electrical resistance of the PTC ceramic material depends upon the temperature thereof as seen in lines 1 and 2 of FIG. 1. Namely, the electrical resistance of the PTC ceramic material increases with the increase in temperature of the material, when this temperature exceeds a certain point referred to as the Curie point. The Curie point should be in the range of from 140° to 210° C., preferably from 150° to 185° C. When the Curie point is lower than 140° C., the amount of heat radiated from the heating element is reduced, while at a Curie point above 210° C. the oscillation phenomena is realized due to the passage of an abnormal current through the heating element. The Curie point indicates a temperature at which the electrical resistance of the PTC ceramic material is twice as high as the minimum electrical resistance. The electrical resistance of the PTC ceramic material at a predetermined temperature, denoted as "F" in FIG. 1, is dependent upon the temperature coefficient of the PTC ceramic materials. The PTC ceramic materials 1 and 2 have, thus, different electrical resistances $R_{(1)}$ and $R_{(2)}$, respectively, at the temperature F.

The temperature coefficient ($\alpha$) of the electrical resistance is calculated by the equation:

$$\alpha = 2.303\ \log R_{T2} - \log R_{T1}/\Delta T,$$

wherein $R_{T1}$, indicates the electrical resistance at temperature $T_1$, which is higher than the Curie point, $R_{T2}$ indicates the electrical resistance at a temperature $T_2$ higher than $T_1$, and $\Delta T$ indicates $T_2$-$T_1$. The temperature $T_1$ is usually set 10° C. higher than the Curie point and the temperature $T_2$ is 20° C. higher than $T_1$.

The temperature coefficient (α) according to the present invention should be from 5 to 20%/°C., more preferably from 8 to 15%/°C.

The amount of heat generated from the heating element constructed of PTC ceramic material depends partly upon the voltage applied to the heating element, partly upon the air fed through the channels of the element, partly upon the temperature of the air and partly upon the total surface area of the channel walls of the element. The heat generating amount (Wh) is calculated herein relying on the premise that the voltage is 100 V and, further, the air at a temperature of 20° C. is fed at a rate of 400 l/min. It is, however, obvious that the air can be fed to the channels of the heating element at various rates and, further, that the voltage value can be varied. The heat generating amount of the heating element should be from approximately 400 to 600 watts. With an increase of the heat generating amount (Wh) over 650 watts, although in view of the heat generating efficiency the heat generating amount should be greater, the breakdown voltage of the heat generating element is disadvantageously reduced. When the heat generating amount is lower than 300 watts, the size of the heating element relative to the heat generating amount is disadvantageously increased. The preferable heat generating amount is from approximately 400 to 600 watts.

One of the features of the present invention is that the heat generating amount from the heating element made of the PTC ceramic material is increased. The increase of the heat generating amount can be determined by the ratio of the heat generating amount (Wh), relative to the total surface area of the channel walls (S) mentioned above. This heat to total surface ratio Rhs calculated by Wh/S should be higher than 1.4 Watt/cm$^2$. It is easily understood that when the ratio Rhs is lower than the minimum amount, it is necessary to form a considerably large number of the channels through the heating elements and, consequently, the heating element becomes large in size.

When the temperature coefficient (α) of the electrical resistance is selected so that it is between 5 to 20%/°C., the ratio Rhs mentioned above is advantageously large. When the temperature coefficient exceeds 20%/°C., the heat generating amount (Wh) is decreased and it is thus, necessary to enlarge the size of the heating element. When the temperature coefficient (α) is lower than 5%/°C., it is practically impossible to use the PTC ceramic material as the heating element because of the low breakdown voltage.

In the PTC ceramic material having a temperature coefficient of the electrical resistance of from 5 to 20%/°C., it is preferable to use from 38.7 to 47.3 molar % of BaO, from 2.5 to 11 molar % of PbO, 49.8 to 51% of $TiO_2$, from 0.05 to 0.3% of a semiconductor forming element and from 0.002 to 0.015 part by weight of Mn based on one hundred part by weight of total of BaO, PbO, $TiO_2$ and the semiconductor forming element. The composition other than Mn of the PTC ceramic material is calculated so that the total of the molar percentages is one hundred. The weight part of Mn is calculated so that the total amount of the ingredients other than Mn corresponds to one hundred parts by weight. The semiconductor forming element is an oxide of at least one metal selected from the group consisting of Bi, Sb, Ta, Nb, W and a rare earth metal. It is even more preferable to use from 41.7 to 45.9 molar % of BaO from 4 to 8 molar % of PbO, from 49.8 to 51.0 molar % of $TiO_2$, from 0.05 to 0.3 molar % of a semiconductor forming element, and from 0.002 to 0.015 part by weight of Mn based on a hundred part by weight of total of BaO, PbO, $TiO_2$ and the semiconductor forming element. It is still more preferable to use from 43.275 to 44.375 molar % of BaO, from 5.45 to 6.5 molar % of PbO, from 50.0 to 50.5 molar % of $TiO_2$, from 0.175 to 0.225 molar % of a semiconductor forming element and from 0.008 to 0.013 part by weight of Mn.

The PTC ceramic material is a $BaTiO_3$ type crystal, wherein the BaO component of $BaTiO_3$ is partly replaced by the component PbO, which increases the Curie point as the replacing amount increases. It is, therefore, possible to adjust the Curie point in the ranges of from 140° to 210° C., from 150° to 185° C., and from 170° to 180° C. depending upon the contents of PbO, i.e. from 2.5 to 11 molar %, from 4 to 8 molar % and from 5.45 to 6.5 molar %, respectively. The Mn, which is believed to be present in the PTC ceramic material, in an ionic state, remarkably increases the temperature coefficient (α).

In accordance with one of the objects of the present invention, there is provided a process for producing a ceramic material body having a positive temperature coefficient of electrical resistance and suited for use as a heating element, comprising the steps of:

compressing a powder mixture of the ingredients of the ceramic material into a green compact;

presintering the green compact at a temperature not lower than 1050° C. so as to increase the breakdown voltage of the ceramic material and not higher than 1200° C. so as to increase the heat generation efficiency from the heating element relative to the size of said element;

pulverizing the presintered article produced in the preceding presintering step;

shaping the powder produced in the preceding pulverizing step to the shape of said body; and sintering the shaped body produced in the preceding shaping step at a temperature of from 1250° to 1330° C.

In the process for producing the PTC ceramic material according to the present invention, the powdered ingredients of the ceramic material were compressed under a pressure of 0.2 to 1.0 ton/cm$^2$ so as to produce a green compact. This green compact is then presintered, according to an important feature of the present invention, at a temperature of from 1050° to 1200° C. The presintered body is then pulverized to grain size of from 1.5 to 2.5 micron and, then, well mixed with an organic binder such as polyvinyl alcohol, thereby making the mixture easily shapeable. The weight ratio of ceramic material powder relative to the organic binder should be from 8 to 12. The dispersed ceramic material is then extruded through a mesh or die, to provide the material with the required shape of the heating element body, and subsequently, dried at a temperature of approximately 200° C. The shaped body of the ceramic material is then sintered at a temperature of from 1250° to 1330° C., for 0.5 to 2 hours.

The present invention is explained in detail by way of the Examples set forth below, with reference to FIGS. 1, 2 and 3, wherein:

EXAMPLE 1 (Control)

The ingredients shown in the following Table were prepared to produce a ceramic material having a composition of 44.35 molar % of BaO, 50.0 molar % of $TiO_2$, 5.50 molar % of PbO, 0.15 molar % of $Y_2O_3$ and 0.001 part by weight of Mn.

Table 1

| | | |
|---|---|---|
| $BaCO_3$ | 72.37g | (56.23g BaO) |
| $TiO_2$ | 33.46g | |
| PbO | 10.17g | |
| $Y_2O_3$ | 0.14g | |
| Mn | 0.001 | part by weight |

Figure 1:
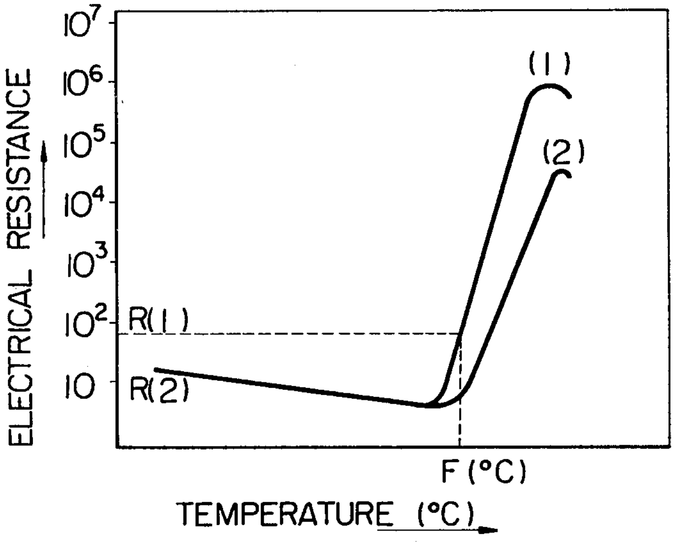
FIG. 1 is a graph showing the resistance temperature characteristics for PTC ceramic materials 1 and 2.
Figure 2:
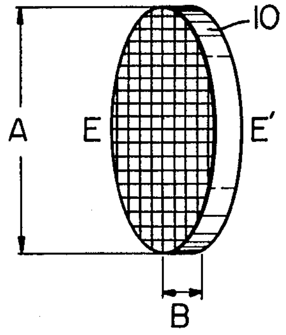
FIG. 2 represents a schematic view of the ceramic material body of the heating element produced in the Examples.
Figure 3:
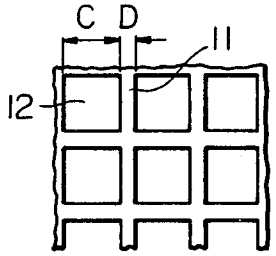
FIG. 3 represents an enlarged, partial side elevational view of the ceramic material body of FIG. 2.

The ingredients were mixed by a ball mill, compressed, presintered at a temperature of 1130° C., pulverized to grain sizes of from 1.5 to 2.0 microns and mixed with an organic binder of polyvinyl alcohol in an amount of 10% by weight. The mixture of the presintered ceramic material and the organic binder was then extruded through the dies so as to shape the mixture as shown in FIGS. 2 and 3, and then, sintered at a temperature of from 1250° C. to 1300° C. The dimensions of the produced ceramic body 10 denoted in FIGS. 2 and 3 as A through D were as follows. The ceramic material body 10 had a diameter A of 40 mm and a thickness B of 10 mm. The channels 12 bounded by the partition parts 11 had a length C of one of the sides of 1.0 mm. The thickness D of the partition parts 11 of the ceramic body was 0.2 mm. The total surface area of the channel walls was 250 $cm^2$.

Silver electrodes (not shown) were formed on the opposite ends of the partition parts 11 by the screen printing technique. The Curie point of the ceramic material produced was 185° C., and the electrical resistance at 20° C. ($R_{20}$) was 15Ω. The temperature coefficient was calculated by the equation of:

$$\alpha=2.303 \log R_{T2}-\log R_{T1}/\Delta T,$$

wherein ΔT was 20° C.=215° C.($T_2$)−195° C.($T_1$).

The measured temperature coefficient ($\alpha$) was 3%/°C. The produced heating element was subjected to the test of heat generation, which was conducted under the following conditions.

Voltage applied to the heating element was 100 volts.

Feeding rate of ambient air was 400 l/minute.

The measured heat generating amount was 650 watts.

A high voltage was intentionally applied to the ceramic material produced in the form of a disc, so as to increase the temperature of the ceramic material higher than the temperature at which the electrical resistance of the material arrived at its peak value. The voltage value, at which the ceramic material broke down, was obtained by the application of the higher voltage mentioned above. The breakdown voltage amounted to only 180 volts.

EXAMPLE 2

The procedures and measurements of Example 1 were repeated, except that the ingredients of the ceramic material shown in the following Table were used.

Table 2

| | | |
|---|---|---|
| $BaCO_3$ | 72.37g | |
| $TiO_2$ | 33.46g | |
| PbO | 10.17g | |
| $Y_2O_3$ | 0.14g | |
| Mn | 0.002 | part by weight |

The produced ceramic material consisted of 44.35 molar % of BaO, 50.0 molar % of $TiO_2$, 5.50 molar % of PbO, 0.15 molar % of $Y_2O_3$ and 0.002 part by weight of Mn. The Curie point of the ceramic material was 185° C., $R_{20}$ was 17Ω, the temperature coefficient ($\alpha$) was 5%/°C. and the breakdown voltage was 250 volts. The heat generating amount from the heating element was 600 watts.

EXAMPLE 3

The procedures and measurements of Example 1 were repeated, except that the ingredients of the ceramic material shown in the following Table were used.

Table 3

| | | |
|---|---|---|
| $BaCO_3$ | 72.37g | |
| $TiO_2$ | 33.46g | |
| PbO | 10.17g | |
| $Y_2O_3$ | 0.14g | |
| Mn | 0.008 | part by weight |

The produced ceramic material consisted of 44.35 molar % of BaO, 50.0 molar % of $TiO_2$, 5.50 molar % of PbO, 0.15 molar % of $Y_2O_3$ and 0.008 part by weight of Mn. The Curie point of the ceramic material was 185° C., $R_{20}$ was 23Ω, the temperature coefficient ($\alpha$) was 15%/°C. and the breakdown voltage was 800 volts. The heat generating amount from the heating element was 480 watts.

EXAMPLE 4

The procedures and measurements of Example 1 were repeated, except that the ingredients of the ceramic material show in the following Table were used.

Table 4

| | | |
|---|---|---|
| $BaCO_3$ | 72.37g | |
| $TiO_2$ | 33.46g | |
| PbO | 10.17g | |
| $Y_2O_3$ | 0.14g | |
| Mn | 0.015 | part by weight |

The produced ceramic material consisted of 44.35 molar % of BaO, 50.0 molar % of $TiO_2$, 5.50 molar % of PbO, 0.15 molar % of $Y_2O_3$ and 0.015 part by weight of Mn. The Curie point of the ceramic material was 185° C., $R_{20}$ and was 27Ω, the temperature coefficient ($\alpha$) was 5%/°C. and the breakdown voltage was 950 volts. The heat generating amount from the heating element was 400 watts.

EXAMPLE 5 (Control)

The procedures and measurements of Example 1 were repeated, except that the ingredients of the ceramic material show in the following Table were used.

Table 5

| | |
|---|---|
| $BaCO_3$ | 72.37g |
| $TiO_2$ | 33.46g |
| PbO | 10.17g |

Table 5-continued

| | | |
|---|---|---|
| $Y_2O_3$ | 0.14g | |
| Mn | 0.025 | part by weight |

The produced ceramic material consisted of 44.35 molar % of BaO, 50.0 molar % of $TiO_2$, 5.50 molar % of PbO, 0.15 molar % of $Y_2O_3$ and 0.025 part by weight of Mn. The Curie point of the ceramic material was 185° C., $R_{20}$ was 30Ω, the temperature coefficient (α) was 25%/°C. and the breakdown voltage was 1050 volts. The heat generating amount from the heating element was 330 watts.

What we claim is:

1. In a heating element essentially consisting of:

a body of ceramic semiconductive material having a positive temperature coefficient of electrical resistance, said body including a number of channels for a fluid medium passage regularly arranged in the body having walls with a total surface area;

a pair of electrodes electrically connected to said ceramic body at the opposite sides of the body; and a means for feeding said fluid medium through said channels;

the improvement comprising using ceramic semiconductive material have a positive temperature coefficient of electrical resistance of from 5 to 20%/°C., a Curie point in the range of from 150° to 185° C., and a breakdown voltage of from 250 to 950 V/cm, wherein said ceramic material consists essentially of from 38.7 to 47.3 molar % of BaO, from 2.5 to 11 molar % of PbO, from 49.8 to 51 molar % of $TiO_2$, from 0.05 to 0.4 molar % of a semiconductor forming element consisting of an oxide of at least one metal selected from the group consisting of Bi, Sb, Ta, Nb, W and a rare earth metal, said molar percentages being based on the total moles of BaO, PbO, $TiO_2$ and the semiconductor forming element in the ceramic semiconductive material, and from 0.002 to 0.015 parts by weight of Mn based on one hundred parts by weight of the total of BaO, PbO, $TiO_2$ and the semiconductor forming element; and wherein when a voltage of 100 V is applied to the body and said fluid medium is fed at a rate of 400 l/minute, the ratio of heat generating amount relative to the total surface area of the walls of said channels is higher than 1.6 watt/$cm^2$.

2. The heating element according to claim 1, wherein said ceramic material consists essentially of from 41.7 to 45.9 molar % of BaO, from 4 to 8 molar % of PbO, from 49.8 to 51.0 molar % of $TiO_2$, from 0.05 to 0.3% of the semiconductor forming element and from 0.002 to 0.0015 part by weight of Mn.

3. The heating element according to claim 2, wherein said ceramic material consists essentially of from 43.275 to 44.375 molar % of BaO, from 5.45 to 6.5 molar % of PbO, from 50.0 to 50.5 molar % of $TiO_2$, from 0.175 to 0.225 molar % of the semiconductor forming element, and from 0.008 to 0.013 part by weight of Mn.

* * * * *